(12) United States Patent
Gandhi et al.

(10) Patent No.: US 10,915,445 B2
(45) Date of Patent: Feb. 9, 2021

(54) COHERENT CACHING OF DATA FOR HIGH BANDWIDTH SCALING

(71) Applicant: NVIDIA Corporation, Santa Clara, CA (US)

(72) Inventors: Wishwesh Anil Gandhi, Sunnyvale, CA (US); Tanmoy Mandal, Saratoga, CA (US); Ravi Kiran Manyam, San Ramon, CA (US); Supriya Shrihari Rao, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/134,379

(22) Filed: Sep. 18, 2018

(65) Prior Publication Data

US 2020/0089611 A1 Mar. 19, 2020

(51) Int. Cl.
*G06F 12/0815* (2016.01)
*G06F 12/0808* (2016.01)
(Continued)

(52) U.S. Cl.
CPC ...... *G06F 12/0815* (2013.01); *G06F 12/0808* (2013.01); *G06F 12/0813* (2013.01);
(Continued)

(58) Field of Classification Search
CPC .... G06F 12/08; G06F 12/084; G06F 12/0808; G06F 12/0811; G06F 12/0813;
(Continued)

(56) References Cited

U.S. PATENT DOCUMENTS 6,374,332 B1 4/2002 Mackenthun et al.
6,922,755 B1 7/2005 Safranek et al.
(Continued)

FOREIGN PATENT DOCUMENTS

EP 1839156 B1 7/2008

OTHER PUBLICATIONS

Molka et al., "Cache Coherence Protocol and Memory Performance of the Intel Haswell-EP Architecture," Preprint from IEEE 2015 44th International Conference on Parallel Processing, retrieved from https://tu-dresden.de/zih/forschung/ressourcen/dateien/abgeschlossene-projekte/benchit/2015_ICPP_authors_version.pdf?lang=en, 10 pages.
(Continued)

*Primary Examiner* — Yaima Rigol
*Assistant Examiner* — Kendrick Lam
(74) *Attorney, Agent, or Firm* — Leydig, Voit & Mayer, Ltd.

(57) ABSTRACT

A method, computer readable medium, and system are disclosed for a distributed cache that provides multiple processing units with fast access to a portion of data, which is stored in local memory. The distributed cache is composed of multiple smaller caches, and each of the smaller caches is associated with at least one processing unit. In addition to a shared crossbar network through which data is transferred between processing units and the smaller caches, a dedicated connection is provided between two or more smaller caches that form a partner cache set. Transferring data through the dedicated connections reduces congestion on the shared crossbar network. Reducing congestion on the shared crossbar network increases the available bandwidth and allows the number of processing units to increase. A coherence protocol is defined for accessing data stored in the distrib-
(Continued)

uted cache and for transferring data between the smaller caches of a partner cache set.

32 Claims, 11 Drawing Sheets

(51) Int. Cl.
*G06F 13/16* (2006.01)
*G06F 13/40* (2006.01)
*G06F 12/0813* (2016.01)

(52) U.S. Cl.
CPC ...... *G06F 13/1668* (2013.01); *G06F 13/4027* (2013.01); *G06F 2212/608* (2013.01)

(58) Field of Classification Search
CPC ............. G06F 12/0815; G06F 12/0824; G06F 12/0828; G06F 12/0891; G06F 12/0893; G06F 2212/608; G06F 13/1668
See application file for complete search history.

(56) References Cited

U.S. PATENT DOCUMENTS

| | | | |
|---|---|---|---|
| 7,120,755 B2 | 10/2006 | Jamil et al. | |
| 7,272,688 B1 | 9/2007 | Glasco | |
| 7,581,068 B2 | 8/2009 | Gilbert et al. | |
| 7,702,875 B1* | 4/2010 | Ekman | G06F 12/08 710/68 |
| 8,095,617 B2 | 1/2012 | Johnsen et al. | |
| 8,099,650 B1 | 1/2012 | Glasco et al. | |
| 8,984,228 B2 | 3/2015 | Liu et al. | |
| 9,170,946 B2 | 10/2015 | Hum et al. | |
| 9,367,473 B2 | 6/2016 | Kuskin | |
| 9,619,396 B2 | 4/2017 | Blankenship et al. | |
| 2003/0084248 A1* | 5/2003 | Gaither | G06F 12/0804 711/133 |
| 2005/0144397 A1 | 6/2005 | Rudd et al. | |
| 2007/0150664 A1 | 6/2007 | Dombrowski et al. | |
| 2011/0022801 A1* | 1/2011 | Flynn | G06F 9/52 711/120 |
| 2014/0189239 A1 | 7/2014 | Hum et al. | |
| 2014/0281270 A1 | 9/2014 | Neefs et al. | |
| 2014/0297957 A1* | 10/2014 | Aoyagi | G06F 12/0804 711/120 |
| 2015/0254182 A1 | 9/2015 | Asher et al. | |
| 2015/0331794 A1* | 11/2015 | Ren | H04L 67/1095 709/214 |
| 2018/0074958 A1* | 3/2018 | Jayasena | G06F 12/0811 |

OTHER PUBLICATIONS

Dublish et al., "Cooperative Caching for GPUs," ACM Transactions on Architecture and Code Optimization, vol. 13, No. 4, Article 39, Dec. 2016, pp. 39:1-39:25.

Iyer et al., "Switch Cache: A Framework for Improving the Remote Memory Access Latency of CC-NUMA Multiprocessors," Proceedings Fifth International Symposium on High-Performance Computer Architecture, retrieved from https://ieeexplore.ieee.org/document/744357/, Jan. 9-13, 1999, 9 pages.

* cited by examiner

COHERENT CACHING OF DATA FOR HIGH BANDWIDTH SCALING

FIELD OF THE INVENTION

The present invention relates to data caching and more specifically to coherent data caching.

BACKGROUND

When multiple processing units are included in a processor, each processing unit may include a cache that is directly coupled to a slice of local memory. In other words, each processing unit includes a slice of a distributed cache. Conventionally, only the cache that is directly coupled to the slice of local memory can cache data stored in the slice of local memory. Processing units within the processor access the cache (and slice of local memory) through a crossbar network within the processor. Congestion on the crossbar network limits the ability to increase the number of processing units in the processor, thereby limiting the ability to increase performance. Physical layout of the caches is constrained because the caches should be located close to the crossbar network to minimize the length of wires in the crossbar network for high speed operation and minimize the die area consumed by the crossbar network. There is a need for addressing these issues and/or other issues associated with the prior art.

SUMMARY

A method, computer readable medium, and system are disclosed for a distributed cache storage, comprising a first cache storage coupled to a first slice of memory and a second cache storage coupled to a second slice of the memory. The first cache storage includes a first cache line that stores first data from a first location in the first slice of memory and is coherent with the first location, where the first cache storage is directly coupled to a second cache storage through a dedicated connection and indirectly coupled to the second cache storage through a shared connection. The second cache storage includes a second cache line that stores second data from a second location in the second slice of memory and is coherent with the second location, where the first cache line is written with the second data through the dedicated connection.

DETAILED DESCRIPTION

A processor may include multiple processing units and caches that are each coupled to a slice of local memory. However, in contrast with a conventional distributed cache where only the cache that is directly coupled to a slice of the local memory can cache data stored in the slice of the local memory, the caches are organized into partner sets. One or more caches within a partner set can cache data stored in the slices of the local memory that are directly coupled to the one or more caches within the partner set. Rather than transferring the data through a crossbar network shared with other components such as processing units, the one or more caches within a partner set transfer data and commands through a dedicated connection that is directly coupled to each of the one or more caches within the partner set. Each partner set has a separate dedicated connection or dedicated partner transfer network. In an embodiment, the dedicated connections are on-chip interconnections. In an embodiment, each cache is only included in a single partner set.

Congestion on the crossbar network is reduced and the number of processing units within each processor may be increased. Additionally, multiple processors may be included within a sub-system. The caches in a partner set can communicate with each other without using the crossbar network, thereby improving flexibility of the physical floorplan of the processor and/or sub-system.

Figure 1A:
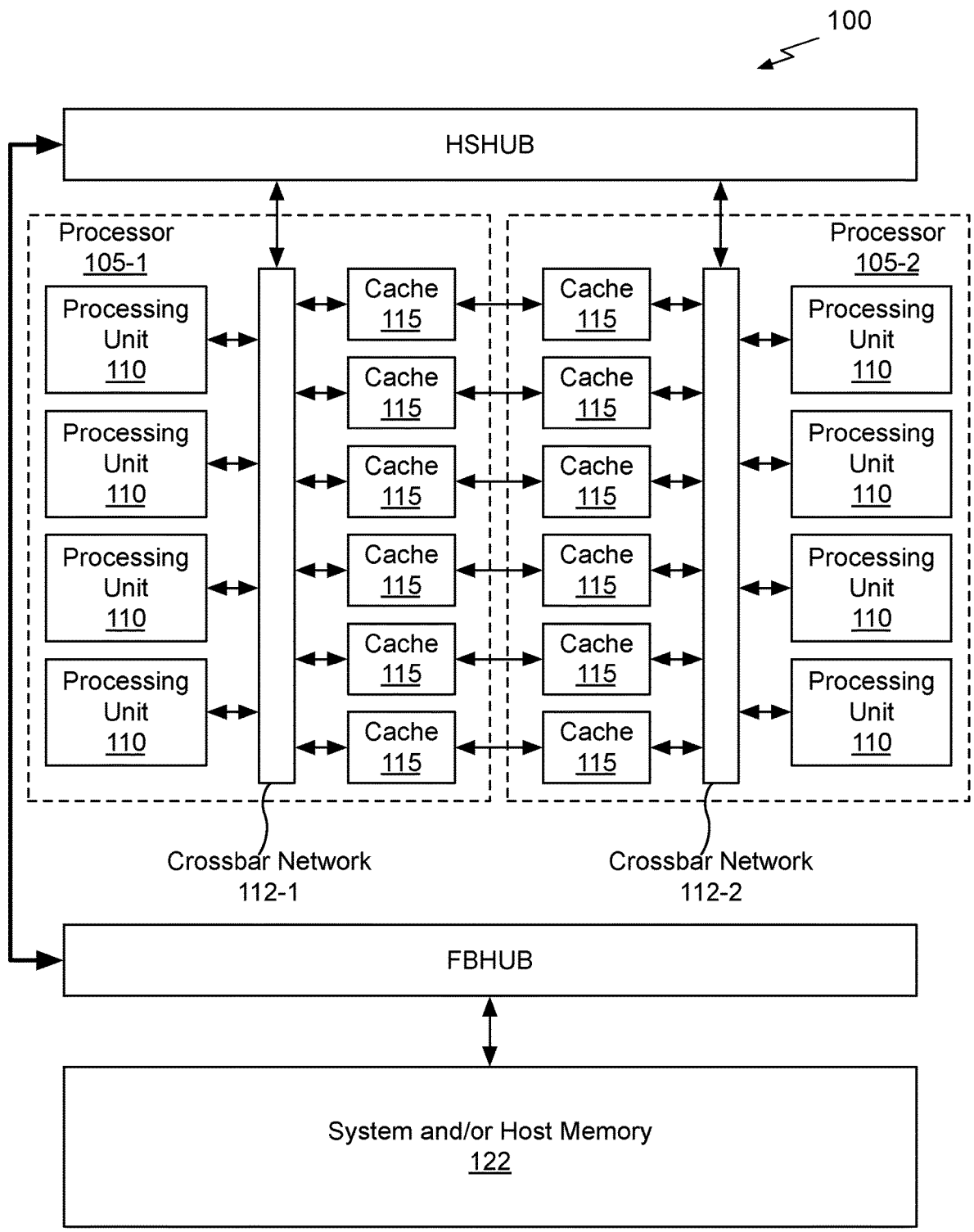
FIG. 1A illustrates a block diagram of a sub-system including two processors, each processor including multiple processing units and respective caches connected via a crossbar network, in accordance with an embodiment.

FIG. 1A illustrates a block diagram of a sub-system 100 including two processors 105 (i.e., 105-1 and 105-2), each processor 105 including multiple processing units 110 and caches 115 connected via a crossbar network 112 (i.e., 112-1 or 112-2), in accordance with an embodiment. Note that the number of caches 115 does not necessarily equal the number of processing units 110. The sub-system 100 includes a FBHUB that couples the processors 105 to the system or host memory 122. A separate HSHUB couples the sub-system to other sub-systems in a system including multiple sub-systems and/or other processors, such as central processing units (CPU), and system memory. In an embodiment, the HSHUB is NVLink. In an embodiment, the FBHUB is PCIe. The FBHUB connects the processor 105 memory system to a PCIe end point implementation. The FBHUB also provides a single point of connection to various IP blocks required in the GPU like video decode. In an embodiment, connections to the FBHUB include clients which do not require high bandwidth for performance. In contrast, the crossbar network 112 allows various processing units 110 fabricated on a single die and/or within a single package to communicate with the distributed cache 115.

The caches 115 in the different processors are organized into partner sets, each partner set including a first cache 115 in the processor 105-1 and a second cache 115 in the processor 105-2. The caches 115 in each partner set are directly coupled to each other through a dedicated connection. In an embodiment, the dedicated connection is a point-to-point connection. The caches 115 are also each coupled to a slice of the local memory 120 (not shown in FIG. 1A). Thus, slices of the local memory 120 is distributed between the processors 105 and the processing units 110.

Within each processor 105, the processing units 110 access a slice of the local memory 120 through the crossbar network 112 and the caches 115 within the processor 105. The slices of the local memory 120 coupled to a processor 105-1 are the processor 105-1's "home" memory. Slices of the local memory 120 that are coupled to the processor 105-2 are the processor 105-1's "remote" memory. Note, that the memory types of home and local are relative to origin and destination of a request. Each processing unit 110 can access data stored in remote memory through either a combination of crossbar network 112 and the HSHUB or through a combination of the crossbar network 112 and the dedicated connections. A processing unit 110 in the processor 105-1 can access any slice of the local memory 120 coupled to the processor 105-2 via the crossbar network 112-1, HSHUB, crossbar network 112-2 and the cache 115 in the processor 105-2 that is coupled to the slice of the local memory 120. Alternatively, processing unit 110 in the processor 105-1 can access any slice of the local memory 120 coupled to the processor 105-2 via the crossbar network 112-1 and a partner cache 115 coupled by a dedicated connection to the cache 115 in the processor 105-2 that is coupled to the slice of the local memory 120.

Figure 1B:
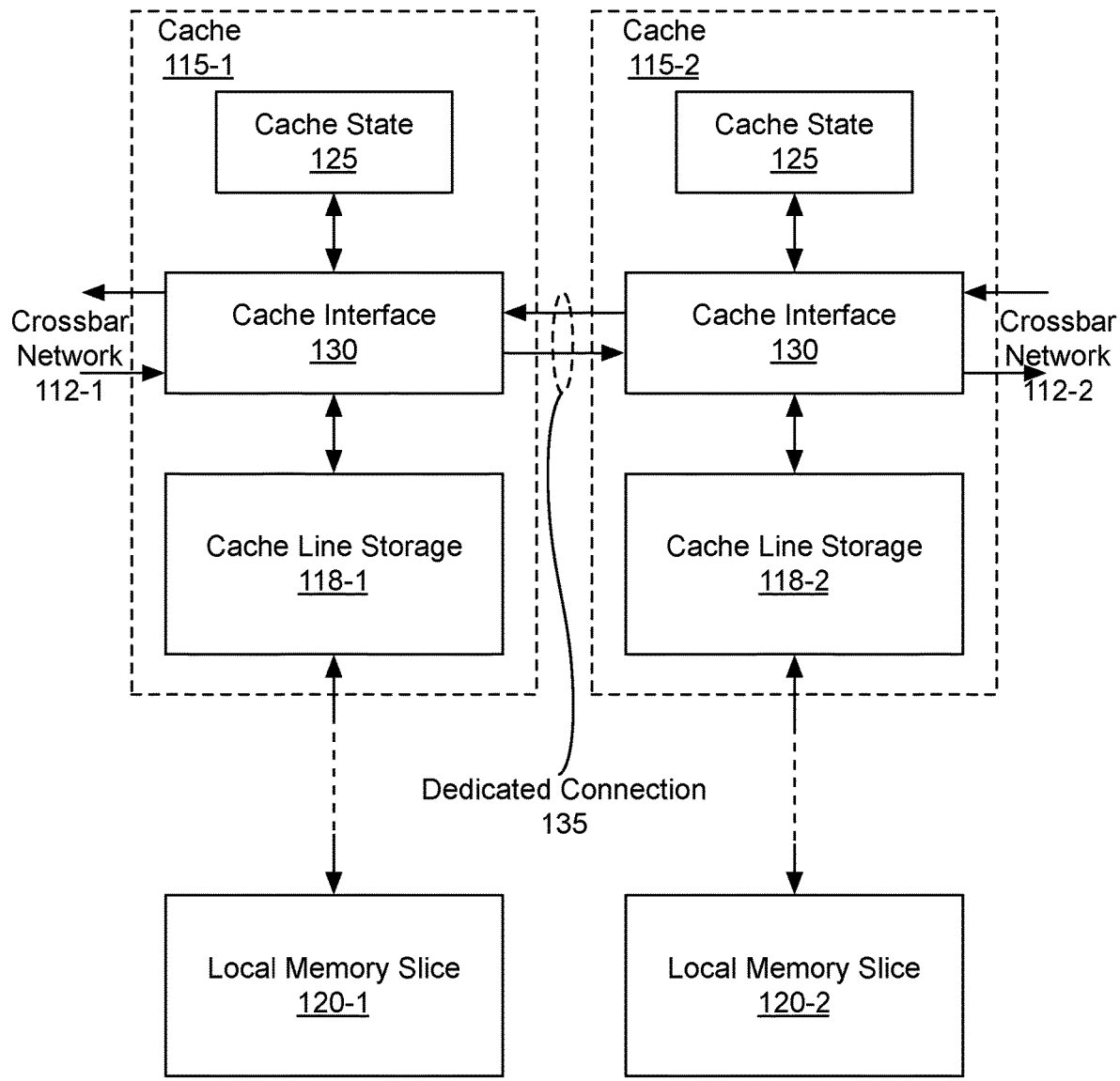
FIG. 1B illustrates a block diagram of caches in a partner set directly coupled through a dedicated connection, in accordance with an embodiment.

FIG. 1B illustrates a block diagram of caches 115 in a partner set directly coupled through a dedicated connection 135, in accordance with an embodiment. Each cache 115 includes multiple cache lines in a cache line storage 118, cache state 125, and a cache interface 130 coupled to the dedicated connection 135 and the crossbar network 112. The cache 115-1 is within the processor 105-1 and the cache 115-2 is within the processor 1105-2 and the dedicated connection 135 is coupled between the processor 105-1 and the processor 105-2.

The cache state 125 stores state information for each cache line in the cache 115. Each cache line can be designated as a point of coherence (POC) or locally cached node (LCN). The state information stored for each cache line may indicate whether the cache line is allocated or available, POC or LCN, and shared or not shared (invalid). To be designated as a POC, the cache must be coupled to the slice of the local memory 120 that stores the data in the cache line. Any cache line within a cache 115 organized in a partner set and not directly coupled to the slice of the local memory 120 that stores the data in the cache line can be designated as an LCN. For example, a cache line in the cache line storage 118-1 caching data stored in the local memory slice 120-1 can be designated as a POC. A cache line in the cache line storage 118-2 caching data stored in the local memory slice 120-1 cannot be designated as a POC, but is instead designated as an LCN of the cache line in the cache line storage 118-1 that stores the data. LCN cache lines allow for data to be transferred from a cache 115 to another processor 105 within the sub-system 100 without passing through the HSHUB and crossbar network 112 within the processor 105 containing the POC cache line. The state information for a POC cache line is allocated, POC, and either shared or not shared. The state information for an LCN cache line is allocated, LCN, and shared. The state information for a non-POC and non-LCN cache line is unallocated.

Only a single POC cache line can be configured for each cache line-sized portion of the data stored in the slice of the local memory. A POC cache line in the cache 115-1 may be partnered with LCN cache lines in the cache 115-2 and other caches 115 (not shown) that are included in a partner set and coupled via the dedicated connection 135. When data is not available in a local cache 115 (in either a POC or LCN cache line), the data is transferred from the local memory 120 through the intra-processor crossbar network 112 or through a combination of the intra-processor crossbar network 112 and the inter-processor network (HSHUB).

The cache state information stored in the cache state 125 indicates whether each cache line is designated as a POC or LCN. For cache lines designated as POCs, the cache state information also indicates if the cache line is shared with a cache line designated as an LCN in a partner cache. When a cache line designated as a POC is not shared, the state information indicating whether the POC cache line is shared is invalid (not shared), meaning the POC cache line is exclusive. Commands and data are transmitted between the caches 115 in a partner set to adhere to a coherence protocol, as described in conjunction with FIGS. 1C, 2A, and 2B. In the context of the following description, a POC cache line is always coherent with the local memory 120 and an LCN cache line is coherent with a corresponding POC cache line. In an embodiment, the state information for an LCN cache line indicates the LCN cache line is coherent with a corresponding POC cache line in the partner cache set.

In an embodiment, any cache line in the cache line storage 118-1 and 118-2 may be allocated as either a POC or LCN without a limit on the maximum number of cache lines allocated to either POC or LCN (up to the number of physical cache lines in the cache line storage 118). In another embodiment, the number of cache lines available for allocation as POC in each cache line storage 118 may be limited by a programmable value. Similarly, the number of cache lines available for allocation as LCN in each cache line storage 118 may be limited by a programmable value.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

In an embodiment, other memory regions that are not directly coupled to the sub-system 100 are also cached in the caches 115. Each memory region may be defined by a memory aperture (i.e., range of virtual or physical addresses) and each location within a memory aperture is designated as home memory for a single cache 115 within one of the processors 105. The location is designated as remote memory for caches 115 within other processors 105. Therefore, a cache line storing data for a home memory is designated as a POC and other cache lines in caches 115 for which the location is remote and that also store the data are designated as LCN because the memory is remote. For example, a memory aperture may be defined as home memory for the cache 115-2 and data for the memory aperture is stored in a first cache line in the cache line storage 118-2 designated as POC. A second cache line in the cache line storage 118-1 may also store the data and is designated as LCN for the first cache line.

In an embodiment, a memory aperture is specified for which data is not stored in cache lines designated as LCN and misses in a cache for which the memory is remote are serviced by the cache associated with the home memory. For example, the initiating cache 115-1 in the processor 105-1 may forward a request accessing an address within an aperture of remote memory to the partner cache 115-2 in the processor 105-2 associated with the home memory over the dedicated connection 135. The partner cache 115-2 then returns the requested data to the initiating cache 115-1 over the dedicated connection 135. In an embodiment, according to the requirements for the memory aperture, the initiating cache 115-1 does not store the data in a cache line. Each memory aperture may be defined to either enable LCN cache lines to store data that is stored in the partner POC cache lines or disable LCN cache lines to store data.

Figure 1C:
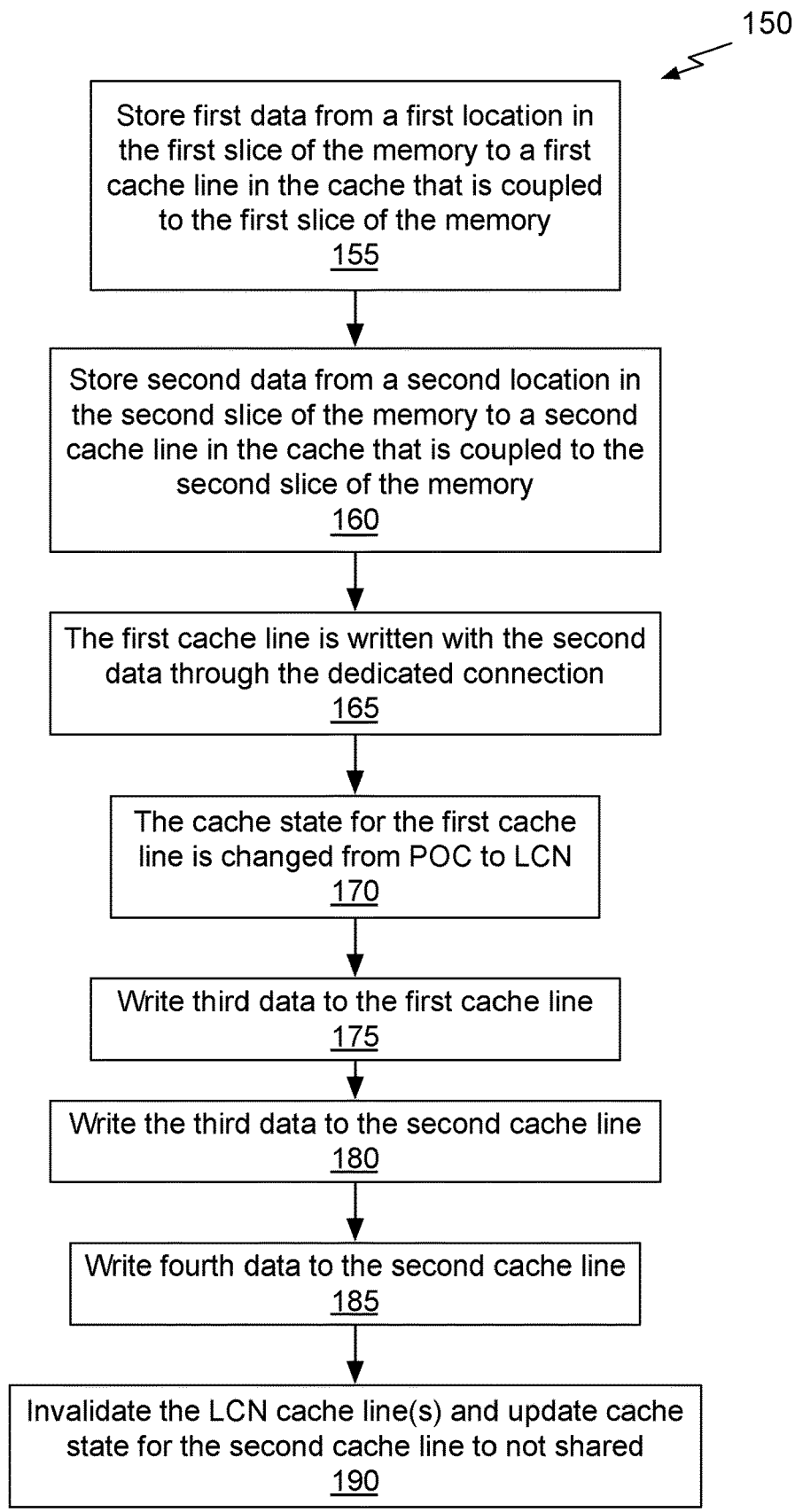
FIG. 1C illustrates a flowchart of a method for coherent caching of data, in accordance with an embodiment.

FIG. 1C illustrates a flowchart of a method for coherent caching of data, in accordance with an embodiment. Although method 150 is described in the context of a processing unit, the method 150 may also be performed by a program, custom circuitry, or by a combination of custom circuitry and a program. For example, the method 150 may be executed by a GPU (graphics processing unit), CPU (central processing unit), or any processor including caches coupled to slices of memory and organized into partner sets. Furthermore, persons of ordinary skill in the art will understand that any system that performs method 150 is within the scope and spirit of embodiments of the present invention.

At step 155, first data from a first location in the first slice of the memory 120 is stored to a first cache line in the cache 115-1 that is coupled to the first slice of the memory 120. The first cache line is coherent with the first location and the first cache line is designated as a POC. At step 160, second data from a second location in the second slice of the memory 120 is stored to a second cache line in the cache 115-2 that is coupled to the second slice of the memory 120. The second cache line is coherent with the second location and the second cache line is designated as a POC.

The first cache 115-1 is directly coupled to the second cache 115-2 through the dedicated connection 135 and is indirectly coupled to the second cache 115-2 through a shared connection (crossbar networks 112 and the HSHUB). At step 165, the first cache line in the first cache 115-1 is written with the second data through the dedicated connection 135. At step 170, the cache state 125 in cache 115-1 for the first cache line is changed from POC to LCN. Specifically, the state information for the first cache line is modified to be invalid (not shared). Furthermore, state information for the first cache line is modified from indicating the first cache line is coherent with the first location to indicate the first cache line is coherent with the second cache line.

At step 175, a write request for the second location is received at the first cache 115-1 and third data is written to the first cache line. According to the state information for the first cache line, the first cache line is an LCN cache line. Therefore, the third data will also be written to the second (POC) cache line. At step 180, the first cache 115-1 transmits a write command to the second cache 115-2 through the dedicated connection 135 and the third data is written to the second cache line. The second cache line is a POC cache line and therefore, maintains coherency with the local memory. The write command is executed in the LCN cache. Since the line is already tracked at the POC, there is no additional state tracking required for the LCN cache line.

At step 185, a write request for the second location is received at the second cache 115-2 and fourth data is written to the second cache line through the dedicated connection 135. According to the state information for the second cache line, the second cache line is a POC cache line. Therefore, at step 190, because the second cache line is shared with at least the first cache line, the second cache 115-2 transmits an invalidate command through the dedicated connection 135. LCN cache lines in the partner set that are shared with the second cache line are invalidated and the state for the second cache line is updated to indicate the second cache line is not shared.

In an embodiment, at step 190, the cache interface 130 transmits a invalidate command for the second location over the dedicated connection 135. The invalidate command is received by the partner cache 115-1 and other partner caches 115 (not shown in FIG. 1B), and state information for any LCN cache lines shared with the second cache line is modified to not shared (invalid). When an LCN cache line is not shared, the LCN cache line is deallocated. When the cache state 125 indicates that a POC cache line is not shared with any LCN cache lines in the partner set, then no additional state update is required when the POC cache line is written because the state information for the POC cache line indicates the POC cache line is not shared.

In an embodiment, at step 190, the cache interface 130 in the cache 115-2 transmits a invalidate command for the second location over the dedicated connection 135. The state information for the second cache line may include a count indicating the number of LCN cache lines that are shared with the second cache line. When the invalidate command is received by the partner caches 115 that have LCN cache lines shared with the second cache line, the LCN cache line is invalidated and an acknowledge command is transmitted to the cache 115-2 over the dedicated connection 135. Once a number of acknowledge commands are received by the cache 115-2 that equals the count of LCN cache lines, the state information for the second cache line is updated to not shared. Any LCN cache lines that are invalid may be deallocated in response to a cache miss and reallocated as either a POC or LCN cache line to store data for a different memory location. An invalid cache line cannot be used to service requests.

In an embodiment, the cache state 125 includes an n-way associative buffer for tracking the shared LCN cache lines. In an embodiment, the storage capacity of the cache state 125 for tracking the shared cache lines is limited and cache lines designated as LCN may be invalidated to effectively evict the LCN cache lines when a predetermined threshold amount of the storage capacity is consumed. In an embodiment, one or more least-recently-used (LRU) LCN cache lines are invalidated.

Figure 2A:
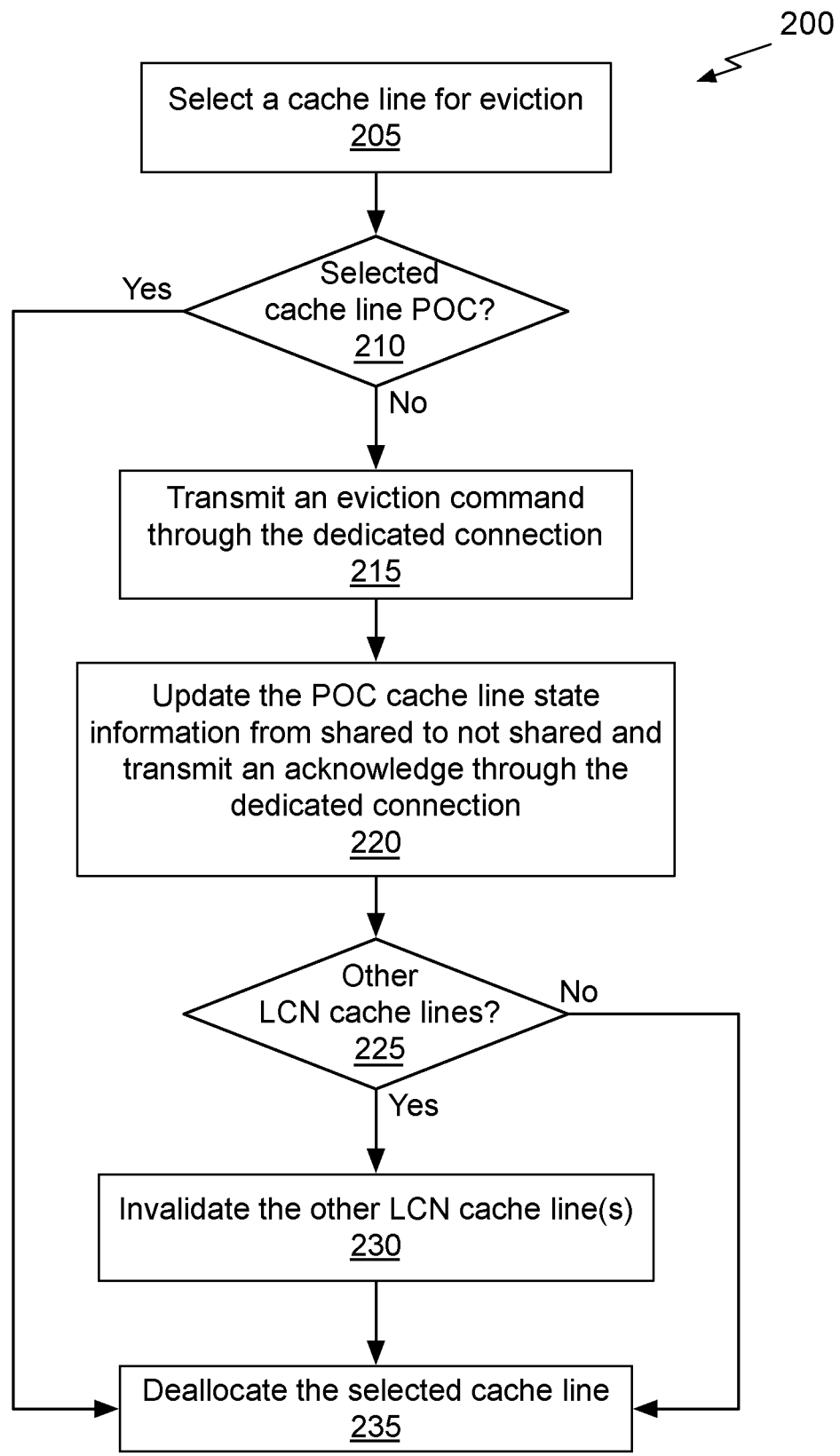
FIG. 2A illustrates a flowchart of a method for evicting a cache line, in accordance with an embodiment.

FIG. 2A illustrates a flowchart of a method for evicting a cache line, in accordance with an embodiment. Although method 200 is described in the context of a processing unit, the method 200 may also be performed by a program, custom circuitry, or by a combination of custom circuitry and a program. For example, the method 200 may be executed by a GPU (graphics processing unit), CPU (central processing unit), or any processor including caches coupled to slices of memory and organized into partner sets. Furthermore, persons of ordinary skill in the art will understand that any system that performs method 200 is within the scope and spirit of embodiments of the present invention.

At step 205, a cache line in a cache storage 118 is selected for eviction. The cache lines in a cache 115 can be evicted due to a variety of reasons such as set/capacity conflicts, cache invalidations, etc. At step 210, the cache 115 determines if the state information stored for the selected cache line indicates that the selected cache line is designated as a POC. If so, then, at step 235, the cache 115 deallocates the selected cache line. The state information for the cache line is unchanged until the cache line is allocated again. Importantly, no commands are transmitted by the cache 115 through the dedicated connection 135, even if the selected cache line is shared with one or more LCN cache lines in partner caches 115. Any LCN cache lines can continue to service read and write requests for the local processing unit.

If, at step 210, the cache 115 determines that the state information stored for the selected cache line indicates the selected cache line is not designated as a POC, then the selected cache line is designated as an LCN, and at step 215, the cache 115 transmitted an eviction command through the dedicated connection 135 to the POC cache line. In an embodiment, the eviction command is only transmitted if the dedicated connection 135 is idle (no other commands are being transmitted). At step 220, the state information for the POC cache line is updated from shared to not shared and an acknowledge is transmitted by the cache 115 including the POC cache line to the cache including the selected LCN cache line.

At step 225, the cache 115 determines if other cache lines in the partner cache set are shared as LCN cache lines, and, if not, the cache 115 proceeds to step 235. Otherwise, at step 230, the cache 115 transmits an invalidate command through the dedicated connection 135 to the other caches 115 in the partner cache set to invalidate the other LCN cache lines.

Figure 2B:
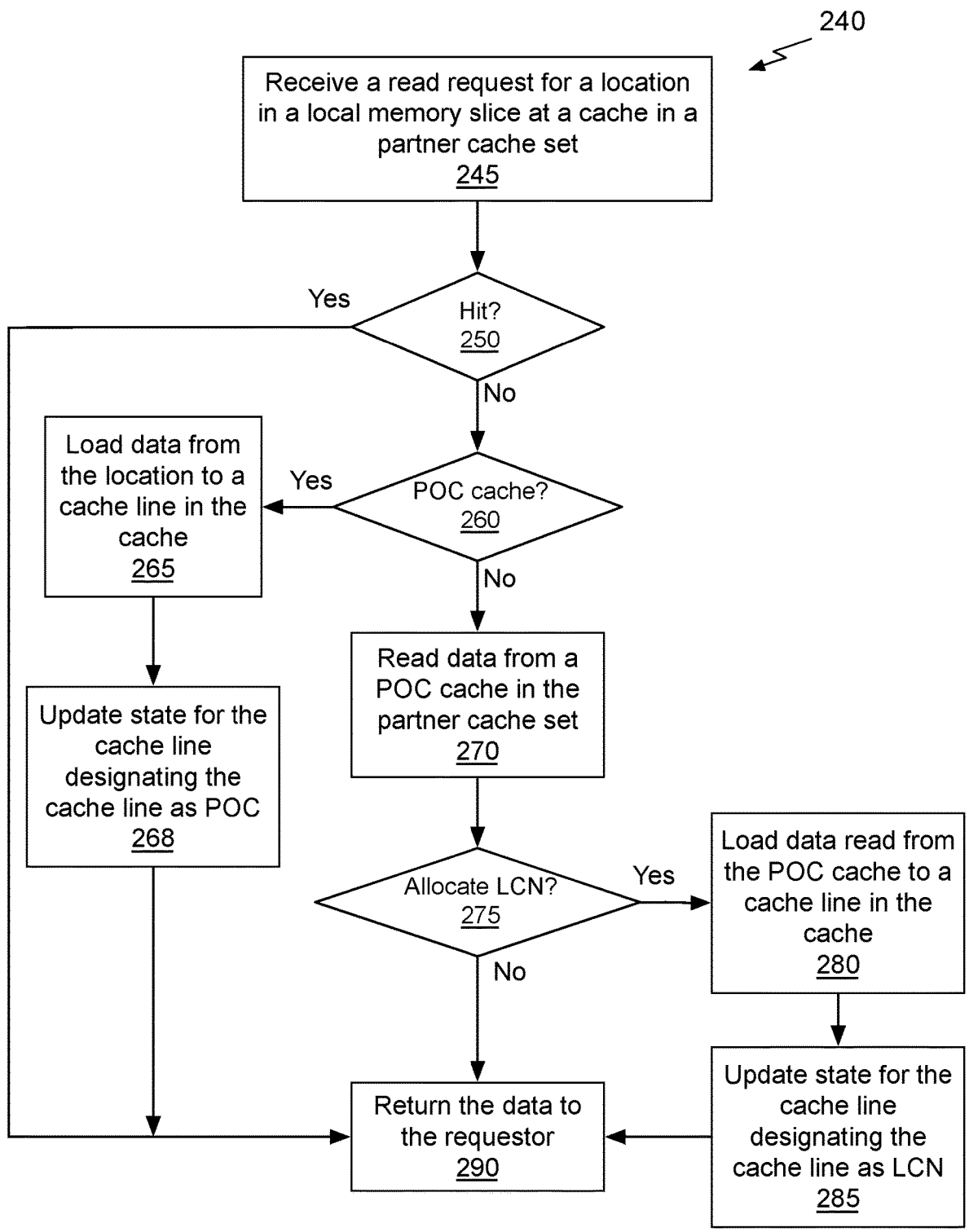
FIG. 2B illustrates flowchart of a method for point of coherence cache line access within a partner set for completing a read request, in accordance with an embodiment.

FIG. 2B illustrates flowchart of a method 240 for POC cache line access within a partner cache set for completing a read request, in accordance with an embodiment. Although method 240 is described in the context of a processing unit, the method 240 may also be performed by a program, custom circuitry, or by a combination of custom circuitry and a program. For example, the method 240 may be executed by a GPU (graphics processing unit), CPU (central processing unit), or any processor including caches coupled to slices of memory and organized into partner sets. Furthermore, persons of ordinary skill in the art will understand that any system that performs method 240 is within the scope and spirit of embodiments of the present invention.

At step 245, a cache 115 in a partner cache set receives a read request for a location in a local memory slice 120 or within a memory aperture defined as being home memory for a particular cache 115 in the partner cache set. If, at step 250, the cache 115 determines a cache hit occurs, meaning the data stored in the location is also stored in the cache line storage 118 within the cache 115, then at step 290, the data is read from the cache line storage 118 and returned to the requestor. Otherwise, when a cache hit does not occur, there is neither a POC cache line nor an LCN cache line in the cache line storage 118. At step 260, the cache 115 determines if the cache 115 is coupled to the local memory slice 120 and can therefore store the data from the location in a cache line designated as a POC. For example, the cache 115-1 can store data from locations in the local memory slice 120-1 in a cache line designated as a POC and the cache 115-1 cannot store data from locations in the local memory slice 120-2 in a cache line designated as a POC. Instead, the cache 115-1 can store data from locations in the local memory slice 120-2 in a cache line designated as an LCN.

If the cache 115, can store the data in a cache line designated as a POC, then at step 265, the cache 115 loads the data from the location to a cache line in the cache line storage 118 within the cache 115. The cache 115 may evict a cache line if no cache line is available for allocation to store the data. At step 268, the cache state 125 within the cache 115 is updated to indicate that the cache line is designated as a POC for the location and, at step 290, the cache 115 returns the data to the requestor.

If, at step 260, the cache 115, cannot store the data in a cache line designated as a POC, then at step 270, the cache 115 reads data from another cache 115 in the partner cache set that stores the data for the location in a POC cache line. For example, when the requested location storing the data is in the local memory slice 120-2, the cache 115-1 may read the data from the cache 115-2 through the dedicated connection 135. The cache 115-1 may transmit a read request to the cache 115-2 through the dedicated connection 135. If the data is not stored in cache 115-2, a cache miss will occur, and the data can be loaded into a POC cache line by the cache 115-2.

At step 275, the cache 115 determines if a cache line, designated as an LCN cache line, will be allocated to store the data. In an embodiment, as previously described, a memory aperture may be defined for which data is not stored in cache lines designated as LCN and misses in a cache 115 are read from a POC cache line in another cache 115 in the partner cache set. In other words, memory aperture may be defined for which allocating (LCN) cache lines that are coherent with cache lines in other caches 115 is disabled. For example, the initiating cache 115-1 that received the read request forwards a request accessing the location within the defined memory aperture to the partner cache 115-2 over the dedicated connection 135. The partner cache 115-2 then returns the requested data to the initiating cache 115-1 over the dedicated connection 135. In an embodiment, according to the requirements for the memory aperture, the initiating cache 115-1 does not allocate a cache line designated as an LCN cache line to store the data and proceeds to step 290.

If, at step 275, the cache 115 determines that a cache line, designated as an LCN cache line, will be allocated to store the data, then at the step 280 the data read from the POC cache line is stored in a cache line designated as an LCN. If a cache line is not available for allocation as an LCN cache line, the cache 115 may select one or more cache lines for eviction. At step 285, the state information for the cache line is updated to indicate the cache line is designated as an LCN cache line and the cache proceeds to step 290.

The method 240 may be modified for completing a write request, as follows. At step 265, data received with the write request is stored to the POC cache line. At step 270 data received with the write request is stored to the POC cache instead of being read from the POC cache. At step 280, data received with the write request is stored to the cache line and step 290 is omitted.

In an embodiment, data stored in memory is compressed and compression meta-data is needed before the data can be decompressed and operated on. The cache 115 may store at least a portion of the compression meta-data for the slice of local memory. In an embodiment, the compression meta-data stored for each POC cache line is not shared with any LCN cache lines. Therefore, when a POC cache line stores compressed data, the compressed data is decompressed using the compression meta-data before being stored in an LCN cache line that is shared with the POC cache line. In an embodiment, the compressed data is decompressed before being transmitted from a POC cache line to another cache 115 in a partner cache set. In an embodiment, LCN cache lines store uncompressed data.

Organizing the caches 115 into partner cache sets forms a distributed cache, where the caches 115 in each partner set are coupled to each other through the dedicated connection 135. Each cache line within a cache 115 may be configured as a POC for a local memory slice 120 or as an LCN for a remote memory (a local memory slice 120 coupled to another cache 115 in the partner cache set). In an embodiment, each cache line within a cache 115 may be configured as a POC for a memory aperture. Transmitting data over the dedicated connections 135 reduces congestion on the crossbar network 112 allowing the number of processing units 110 in each processor 105 to be increased and allowing the number of processors 105 in the sub-system 100 to be increased, thereby increasing performance. The dedicated connections 135 also improves floorplan flexibility by allowing the caches 115 to be located further from the crossbar network 112 in cache processor 105.

Parallel Processing Architecture

Figure 3:
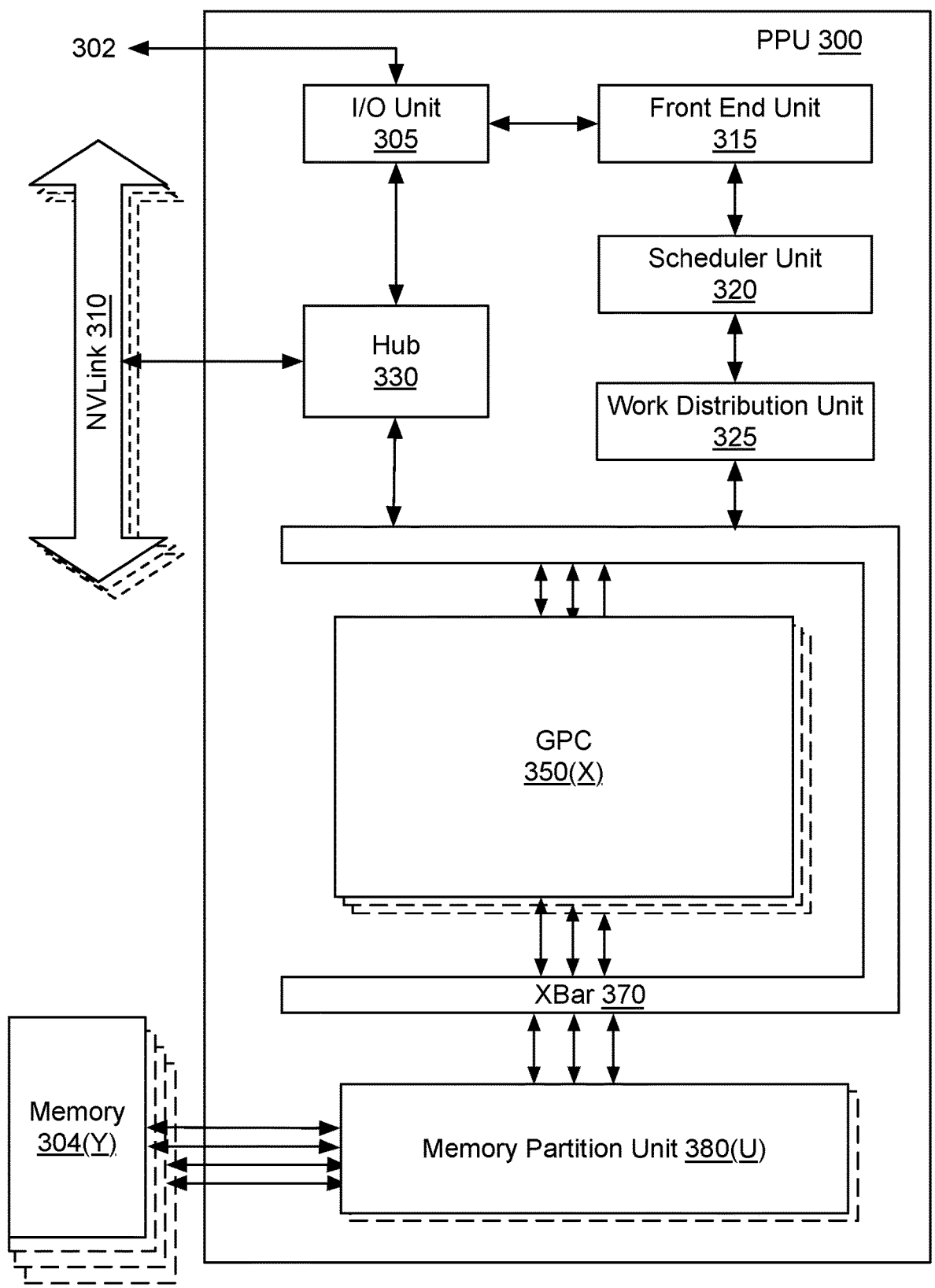
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (XBar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 300 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
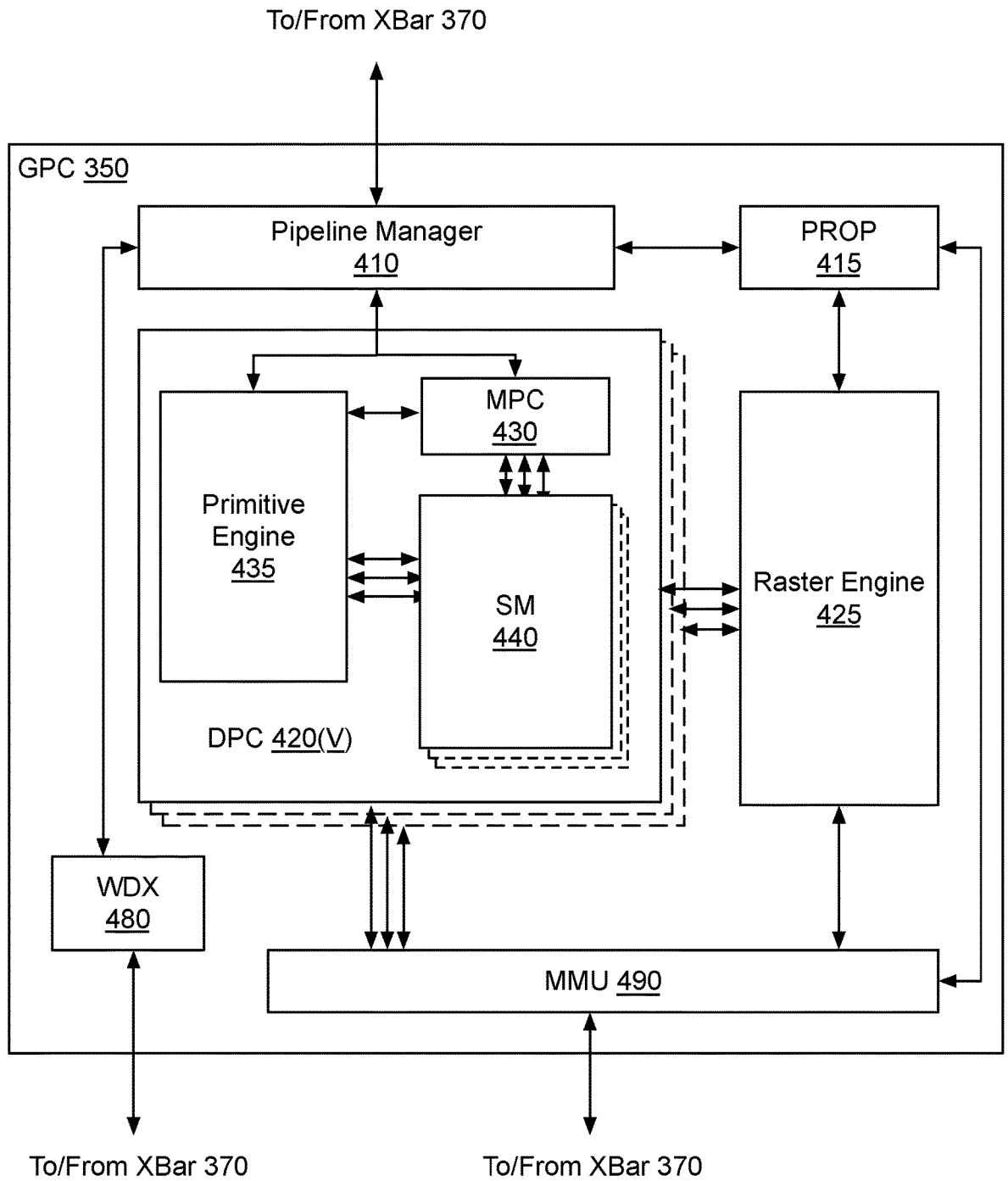
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
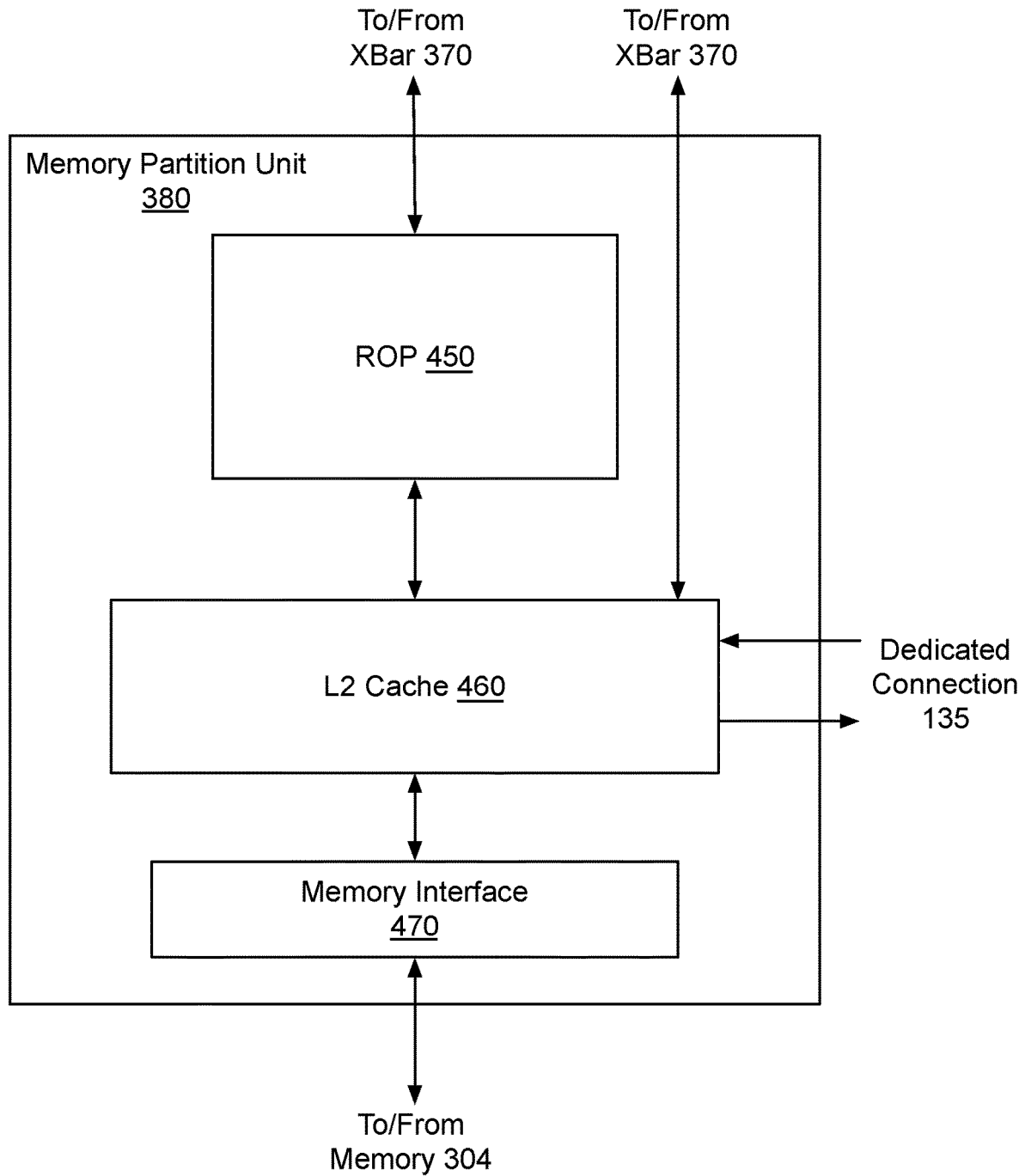
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370. In an embodiment, the L2 cache 460 is a cache 115 and a dedicated connection 135 couples one or more of the L2 caches 460 together forming a partner cache set. Transmitting data through the dedicated connection 135 within a partner cache set reduces the data traffic on the XBar 370 (crossbar network 112) that is shared by the L2 caches 460 within a PPU 300 (processor 105).

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the XBar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
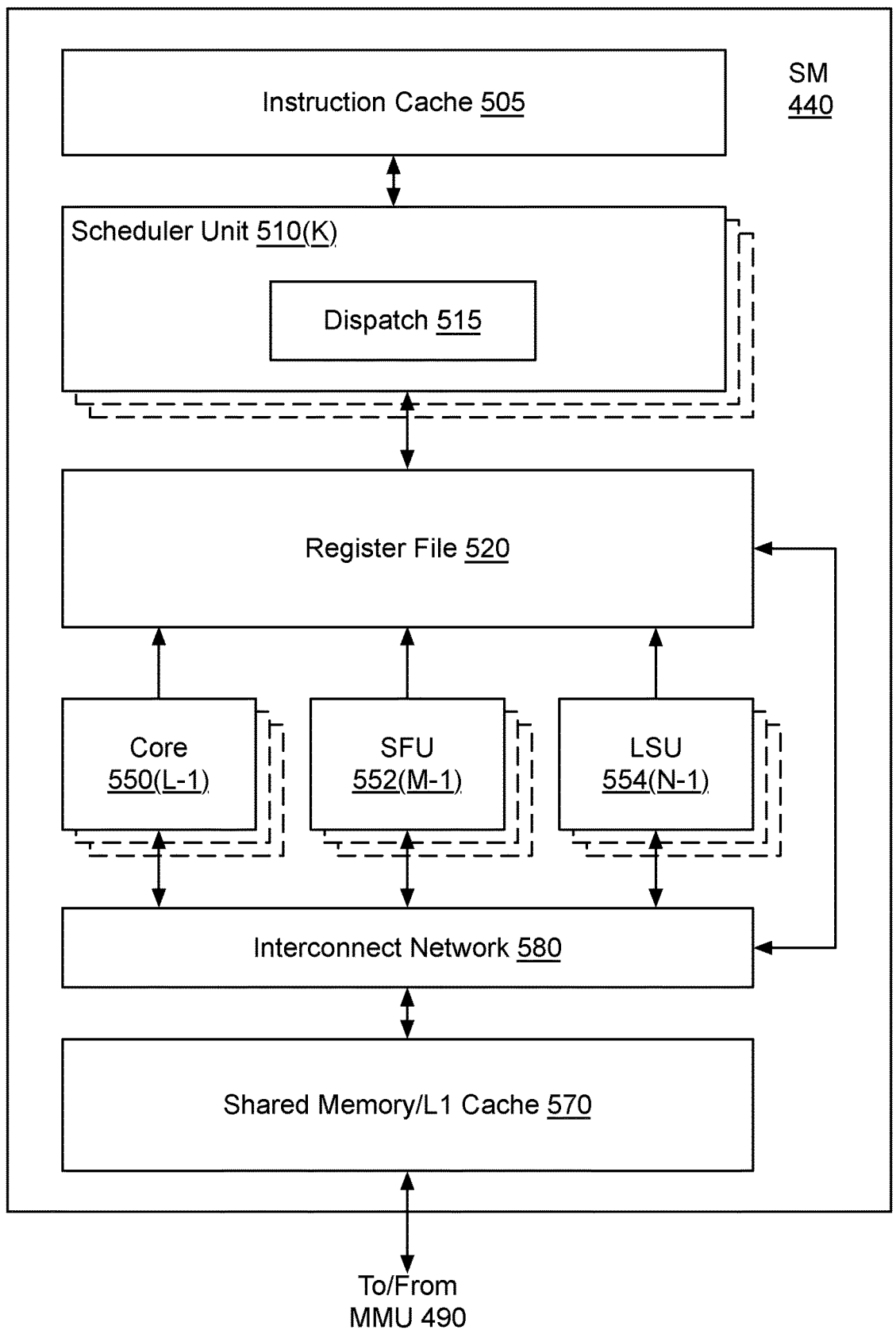
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 570. The texture units implement texture operations such as filtering operations using mip-maps (i.e., texture maps of varying levels of detail). In an embodiment, each SM 400 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
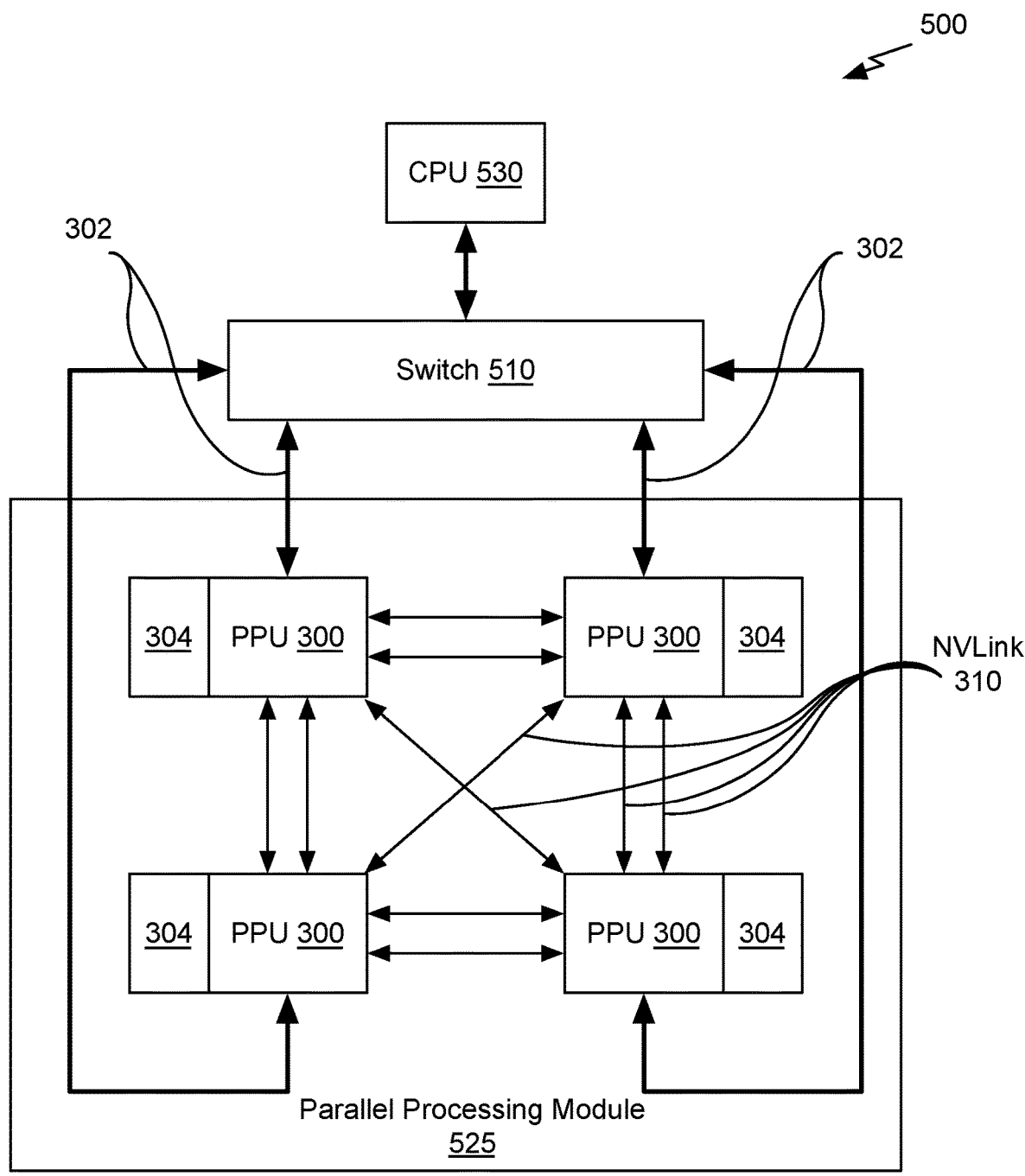
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 150 shown in FIG. 1C, the method 200 shown in FIG. 2A, and/or the method 240 shown in FIG. 2B. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
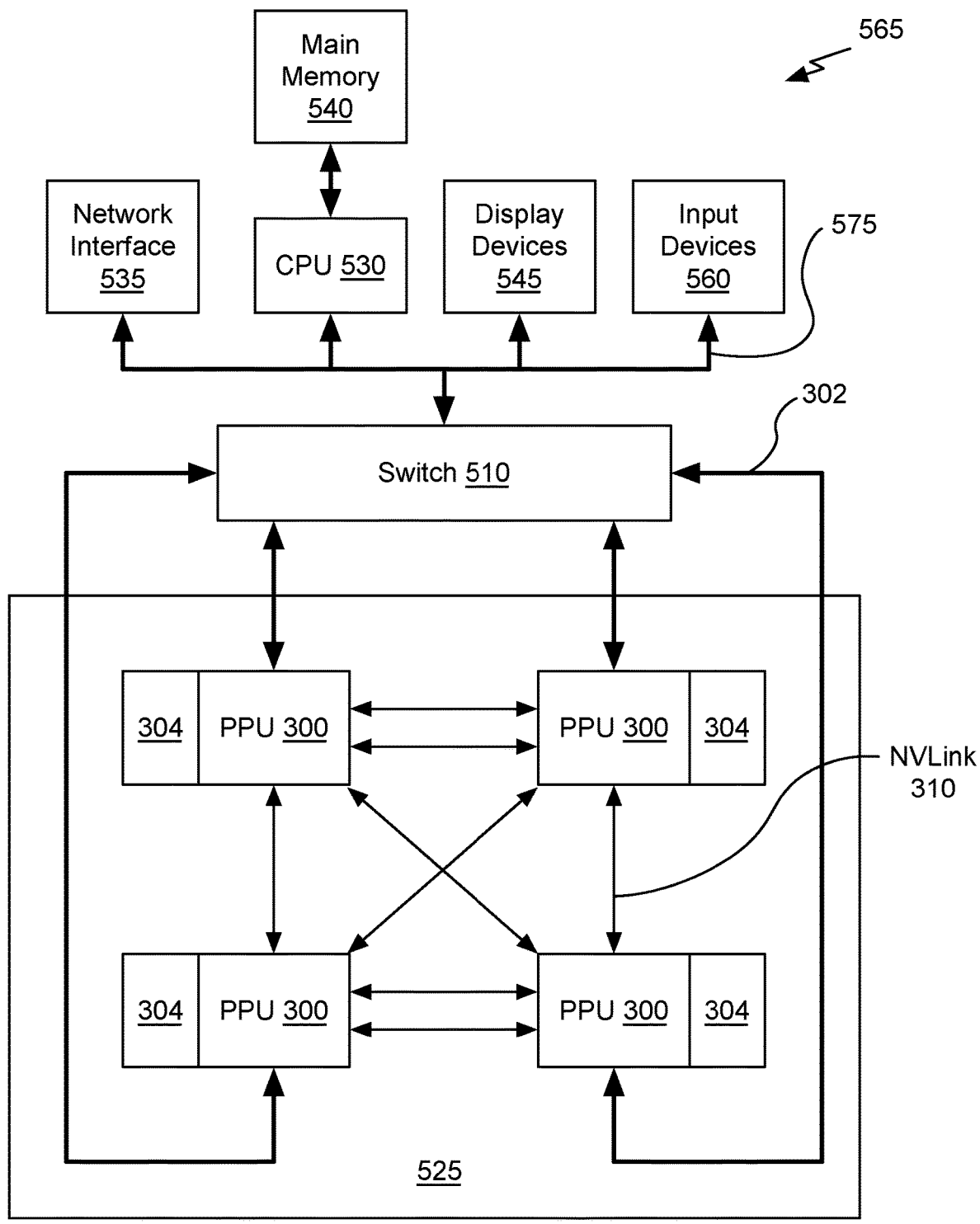
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 150 shown in FIG. 1C, the method 200 shown in FIG. 2A, and/or the method 240 shown in FIG. 2B.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A distributed storage system, comprising:
a first plurality of processing units which includes a first processing unit;
a first plurality of caches which includes a first cache, wherein the first cache is coherent with a first slice of a memory;
a second plurality of processing units which includes a second processing unit;
a second plurality of caches which includes a second cache;
a first connection coupling each of the first plurality of processing units with each of the first plurality of caches;
a second connection coupling each of the second plurality of processing units with each of the second plurality of caches; and
a third connection coupling the first cache and the second cache;
wherein the first processing unit stores first data to the first slice of the memory via the first connection and the first cache without accessing the second connection and without storing the first data to the second cache; and
wherein the second processing unit stores second data to the first slice of the memory via the second connection, the second cache, the third connection, and the first cache without accessing the first connection.

2. The distributed storage system of claim 1, wherein each of the first connection and the second connection is a crossbar.

3. The distributed storage system of claim 1, wherein the third connection is a point-to-point connection.

4. The distributed storage system of claim 1, wherein the memory is a dynamic random access memory (DRAM).

5. The distributed storage system of claim 1, wherein, in response to a read request from the second processing unit, third data from a first cache line in the first cache is written to a second cache line in the second cache.

6. The distributed storage system of claim 5, wherein state information for the first cache line is modified to indicate that the first cache line is shared with another cache.

7. The distributed storage system of claim 5, wherein state information for the second cache line is modified from indicating the second cache line is coherent with a second slice of the memory to indicate the second cache line is coherent with the first cache line.

8. The distributed storage system of claim 7, wherein, the first cache line is selected for eviction and, in response, the first cache deallocates the first cache line and the state information for the second cache line is unchanged.

9. The distributed storage system of claim 5, wherein, in response to receiving from the first processing unit a write request for the first slice of the memory, the first cache is configured to:
transmit a command via the third connection to the second cache to invalidate the second cache line; and
modify state information for the first cache line to indicate that the first cache line is not shared with another cache.

10. The distributed storage system of claim 5, wherein, in response to receiving from the second processing unit a write request for the first slice of the memory, the second cache is configured to:
write fourth data to the second cache line; and
transmit a command to the first cache to write the fourth data to the first cache line.

11. The distributed storage system of claim 5, wherein, the second cache line is selected for eviction and, in response, the second cache transmits an eviction command to the first cache via the third connection and deallocates the second cache line.

12. The distributed storage system of claim 11, wherein, in response to receiving the eviction command, state information for the first cache line is modified to indicate the first cache line is not shared with another cache.

13. The distributed storage system of claim 1, wherein, in response to a read request from the second processing unit, third data from a first cache line in the first cache is provided to the second processing unit without allocating a second cache line in the second cache to store the third data in the second cache.

14. The distributed storage system of claim 1, wherein, in response to a read request from the second processing unit for third data and wherein the third data is stored in a first cache line in the first cache in a compressed format, the first cache is configured to decompress the compressed third data and transmit the decompressed third data to the second cache via the third connection.

15. The distributed storage system of claim 14, wherein the second cache is configured to store the decompressed third data in a second cache line in the second cache.

16. The distributed storage system of claim 1, further comprising a fourth connection coupling each of the second plurality of processing units to each of the first plurality of caches.

17. A method for distributed data storage in a system that includes a first connection coupling each of a first plurality of processing units with each of a first plurality of caches, wherein the first plurality of processing units includes a first processing unit and the first plurality of caches includes a first cache that is coherent with a first slice of a memory; a second connection coupling each of a second plurality of processing units with each of a second plurality of caches, wherein the second plurality of processing units includes a second processing unit and the second plurality of caches includes a second cache; and a third connection coupling the first cache and the second cache, comprising:
storing first data from the first processing unit to the first slice of the memory via the first connection and the first cache without accessing the second connection and without storing the first data to the second cache; and
storing second data from the second processing unit to the first slice of the memory via the second connection, the second cache, the third connection, and the first cache without accessing the first connection.

18. The method of claim 17, wherein each of the first connection and the second connection is a crossbar.

19. The method of claim 17, wherein the third connection is a point-to-point connection.

20. The method of claim 17, wherein the memory is a dynamic random access memory (DRAM).

21. The method of claim 17, further comprising:
in response to a read request from the second processing unit, writing third data from a first cache line in the first cache to a second cache line in the second cache.

22. The method of claim 21, further comprising:
modifying state information for the first cache line to indicate that the first cache line is shared with another cache.

23. The method of claim 21, further comprising:
modifying state information for the second cache line from indicating the second cache line is coherent with a second slice of the memory to indicate the second cache line is coherent with the first cache line.

24. The method of claim 23, further comprising:
selecting the first cache line for eviction; and,
deallocating the first cache line, wherein the state information for the second cache line is unchanged.

25. The method of claim 21, further comprising:
receiving from the first processing unit a write request for the first slice of the memory, transmitting by the first cache a command via the third connection to the second cache to invalidate the second cache line; and
modifying state information for the first cache line to indicate that the first cache line is not shared with another cache.

26. The method of claim 21, further comprising:
receiving from the second processing unit a write request for the first slice of the memory,
writing fourth data to the second cache line; and
transmitting a command by the second cache to the first cache to write the fourth data to the first cache line.

27. The method of claim 21, further comprising:
selecting the second cache line for eviction,
transmitting by the second cache an eviction command to the first cache via the third connection, and;
deallocating the second cache line.

28. The method of claim 27, further comprising:
receiving the eviction command; and
modifying state information for the first cache line to indicate the first cache line is not shared with another cache.

29. The method of claim 17, further comprising:
in response to a read request from the second processing unit, providing third data from a first cache line in the first cache to the second processing unit without allocating a second cache line in the second cache to store the third data in the second cache.

30. The method of claim 17, further comprising:
in response to a read request from the second processing unit for third data and wherein the third data is stored in a first cache line in the first cache in a compressed format, decompressing, by the first cache, the compressed third data, and transmitting by the first cache the decompressed third data to the second cache via the third connection.

31. The method of claim 30, further comprising:
storing by the second cache the decompressed third data in a second cache line in the second cache.

32. The method of claim 17, further comprising a fourth connection coupling each of the second plurality of processing units to each of the first plurality of caches.

* * * * *